(12) United States Patent
Steiner et al.

(10) Patent No.: US 10,410,147 B2
(45) Date of Patent: Sep. 10, 2019

(54) MECHANISM FOR ADAPTIVE MODIFICATION OF AN ATTRIBUTE TREE IN GRAPH BASED CONTACT CENTERS

(71) Applicant: Avaya Inc., Basking Ridge, NJ (US)

(72) Inventors: Robert C. Steiner, Broomfield, CO (US); Wen-Hua Ju, Monmouth Junction, NJ (US)

(73) Assignee: Avaya Inc., Satna Clara, CA (US)

(*) Notice: Subject to any disclaimer, the term of this patent is extended or adjusted under 35 U.S.C. 154(b) by 413 days.

(21) Appl. No.: 14/290,659

(22) Filed: May 29, 2014

(65) Prior Publication Data

US 2015/0350433 A1    Dec. 3, 2015

(51) Int. Cl.
*H04M 3/51*    (2006.01)
*G06Q 10/06*   (2012.01)
*H04M 7/00*    (2006.01)

(52) U.S. Cl.
CPC .... *G06Q 10/06311* (2013.01); *H04M 3/5166* (2013.01); *H04M 7/0012* (2013.01); *H04M 2201/16* (2013.01)

(58) Field of Classification Search
CPC ............... H04M 3/5175; G06Q 10/06311
USPC .................................................. 379/265.03
See application file for complete search history.

(56) References Cited

U.S. PATENT DOCUMENTS

| | | | |
|---|---|---|---|
| 7,065,188 B1* | 6/2006 | Mei | G10L 15/22 379/76 |
| 8,335,704 B2* | 12/2012 | Trefler | H04M 3/5233 705/7.14 |
| 2003/0161463 A1* | 8/2003 | Galvin | H04M 3/51 379/265.01 |
| 2010/0235218 A1 | 9/2010 | Erhart et al. | |
| 2010/0272246 A1* | 10/2010 | Malik | H04M 3/493 379/88.18 |
| 2011/0125793 A1 | 5/2011 | Erhart et al. | |
| 2011/0125826 A1 | 5/2011 | Erhart et al. | |
| 2014/0086401 A1* | 3/2014 | Ristock | H04M 3/5175 379/265.03 |

OTHER PUBLICATIONS

U.S. Appl. No. 14/290,650, filed May 29, 2014, Steiner et al.
U.S. Appl. No. 14/290,654, filed May 29, 2014, Steiner et al.

* cited by examiner

*Primary Examiner* — Ahmad F. Matar
*Assistant Examiner* — Jirapon Intavong
(74) *Attorney, Agent, or Firm* — Sheridan Ross P.C.

(57) ABSTRACT

A mechanism for adaptive modification of an attribute tree in a graph based contact center is described along with various methods and mechanisms for administering the same. Adaptive modification methods are disclosed that allow a graph database to automatically remove and create categories as well as block removal of categories with active relationships. Staff assignment, administrator productivity, and customer service are improved with the assessment, merging, and removal of atrophied categories and the operationally desirable expansion and/or addition of categories.

18 Claims, 6 Drawing Sheets

MECHANISM FOR ADAPTIVE MODIFICATION OF AN ATTRIBUTE TREE IN GRAPH BASED CONTACT CENTERS

FIELD OF THE DISCLOSURE

The present disclosure is generally directed toward communications and more specifically toward contact centers.

BACKGROUND

Attributes in a contact center typically reflect properties and/or types of customers and work items in the contact center. Historically, a contact center has been able to determine what attribute areas have significant growth and what attribute areas have decayed by looking at volume and other indicators. Unfortunately, the job of monitoring all of the attributes and how they are staffed and how regularly used falls to the contact center administrator. This can be a significant job if the contact center is complex and distributed. It would be advantageous to have a graph-based contact center that could manage its own attributes within parameters set by the administrator.

SUMMARY

It is with respect to the above issues and other problems that the embodiments presented herein were contemplated. In particular, embodiments of the present disclosure describe a system and method that provide an automatic expansion and contraction (e.g., modification) of a graph-based attribute tree and subsequent routing of work items based on usage, analysis, and adaptation.

A graph based contact center method and apparatus for adaptive modification of the attribute tree is disclosed that is operable to provide a mechanism allowing attributes to be automatically dropped and created based on use. The goal is to provide auto-filters to administrators and self-rating to agents that allow the mechanism to remove or merge atrophied attributes and to add attributes as operational needs change. The ability to automatically and manually remove and create new attributes can improve customer service and satisfaction.

With adaptive modification, the attribute tree of the graph database can grow or shrink, as needed. Categories may be bifurcated, absorbed, and created. Adaptive modification also provides for automatic flexible adjustment of training based on the changes to the attributes, staffing increases and decreases, scoring, and administration. The adaptive modification may also be used to reduce miscalculation errors. When certain types of work items are continuously routed to the wrong agent or type of agent, upon reaching a threshold, adaptive modification may split categories or redirect routing to appropriate agents.

In another embodiment, the adaptive modification mechanism would be operable to scan for, report on, and provide alerts based on blocking parameters when the administrator requests removal, including the case when a node is still active. Though an administrator may not be able to see one or more relationships, the system would show the administrator what is active in the complexity of the tree. The system would also give warnings as to the side effects of removing categories with active relationships.

In an additional embodiment, non-temporal or event-based changes may also modify the data tree. A product may be removed or manually added by an administrator, for example. Both manual and automatic changes may result.

These and other advantages will be apparent from the disclosure.

In some embodiments, a method is provided that generally comprises:

initiating an analysis routine and, in response thereto, analyzing usage statistics of an attribute assigned designated for at least one of work items and resources in a contact center;

based on the analysis of the usage statistics, determining whether the attribute is overused or underused by a work assignment engine of the contact center;

based on the determination of whether the attribute is overused or underused by the work assignment engine, deciding whether modification of the attribute is desirable to increase efficiency of the work assignment engine;

implementing at least one action consistent with the decision of whether modification of the attribute is desirable;

wherein the at least one action comprises providing an automatically-generated message to a contact center administrator that suggests at least one of the following actions: merge the attribute with another attribute in the contact center, remove the attribute from the contact center, and create a new attribute in the contact center;

wherein the message also comprises a prompt for the contact center administrator that, if selected by the contact center administrator, causes an automatic implementation of the suggested action;

wherein the attribute is included as at least one node in an attribute tree and comprises at least one relationship that links the attribute to another attribute in the contact center;

wherein the analysis routine automatically analyzes usage statistics of every node in the attribute tree;

wherein the attribute describes at least one skill of a resource in the contact center;

wherein the attribute describes at least one processing requirement for a work item in the contact center;

wherein the attribute is determined to be an underused attribute in response to comparing a number of times the attribute has been considered by the work assignment engine over a predetermined amount of time with a minimum threshold value and determining, based on the comparison, that the number of times the attribute has been considered by the work assignment engine over the predetermined amount of time is less than the minimum threshold value;

wherein the attribute is at least one of merged with another attribute and removed from the contact center in response to determining that the attribute is an underused attribute;

wherein the attribute is determined to be an overused attribute in response to comparing a number of times the attribute has been considered by the work assignment engine over a predetermined amount of time with a maximum threshold value and determining, based on the comparison, that the number of times the attribute has been considered by the work assignment engine over the predetermined amount of time is greater than the maximum threshold value; and wherein the new attribute is created in response to determining that the attribute is an overused attribute.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "element" and variations thereof, as used herein, refers to any person, component, work item, organization, device, engine, software, and hardware that is owned, managed, contacted, accessed, and serviced from or by a contact center which have one or more associated attributes. Examples of elements can include, but are not limited to, agents, customers, servers, applications, work items, tasks, groups, skills, communication devices, VDNs, IVRs, CMS, WFM, historical interactions, data, etc.

The phrase "attribute tree" as used herein refers to a set of attributes arranged as nodes that have relationships within a graph database. An attribute is a character, quality, or feature of an entity. Examples of attributes might include without limitation language preference, age, gender, name, region, product information, order information, historical information, and other demographics. Attributes are commonly considered for routing decisions by a work assignment engine to best meet goals and/or desired metrics for a contact center. The attribute tree can be used by a work assignment mechanism directly for matching, eliminating an attribute set and allowing the naturally defined relationships to provide simple proximity determination.

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored. When the computer-readable media is configured as a database, it is to be understood that the database may be any type of database, such as relational, hierarchical, object-oriented, and/or the like.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
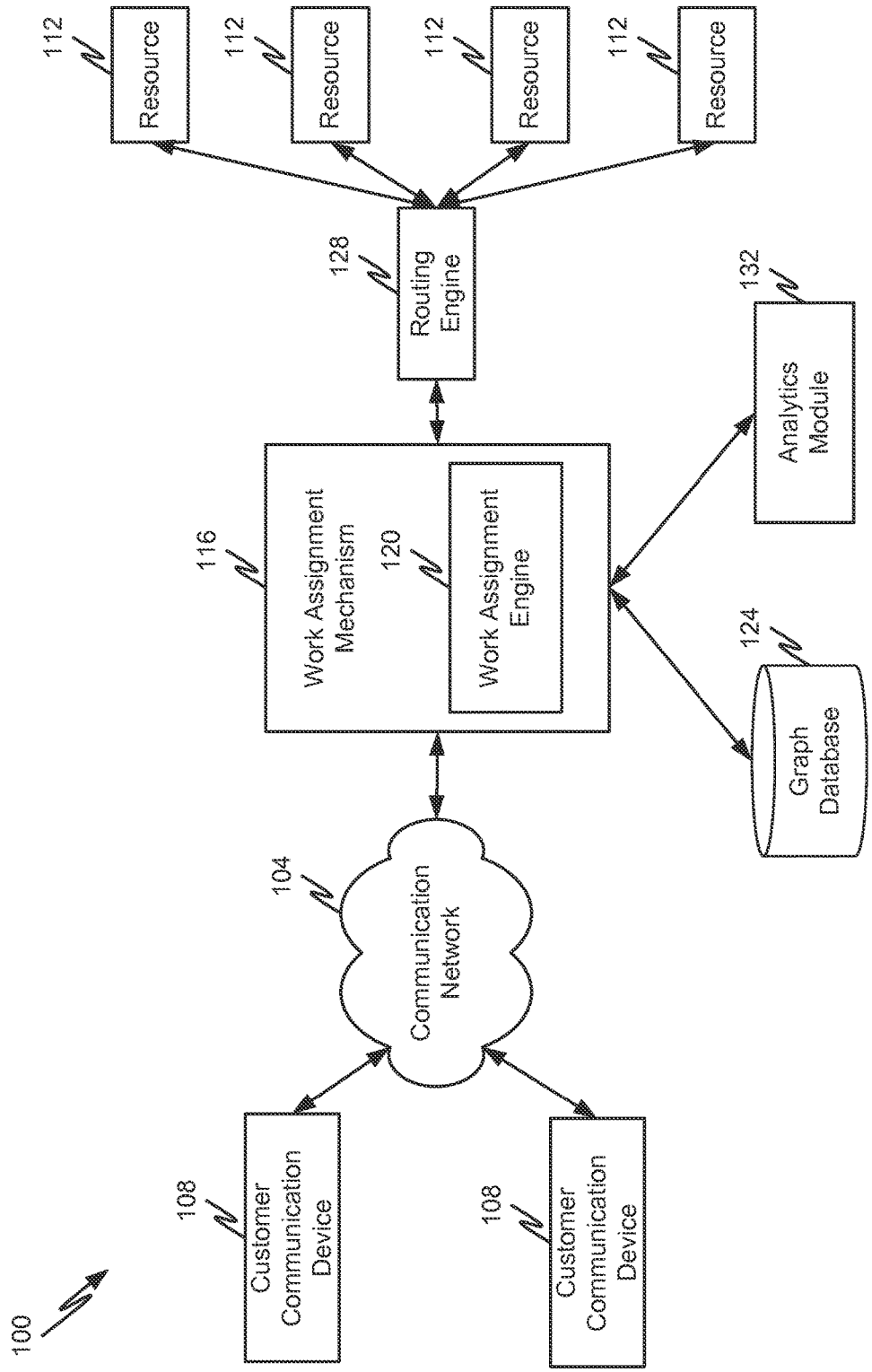
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a graph-based contact center. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating tasks based thereon are described in U.S. Patent Publication Nos. 2010/0235218, 2011/0125826, and 2011/0125793, to Erhart et al, filed Mar. 20, 1010, Feb. 17, 2010, and Feb. 17, 2010, respectively, the entire contents of each are hereby incorporated herein by reference in their entirety. The format of the work item may depend upon the capabilities of the communication device 108 and the format of the communication.

In some embodiments, work items and tasks are logical representations within a contact center of work to be performed in connection with servicing a communication received at the contact center (and more specifically the work assignment mechanism 116). With respect to the traditional type of work item, the communication associated with a work item may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 128 to connect the communication device 108 which initiated the communication with the assigned resource 112. Although the routing engine 128 is depicted as being separate from the work assignment mechanism 116, the routing engine 128 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 128. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. More specifically, the work assignment engine 120 can determine, based on an analysis, which of the plurality of processing resources 112 is eligible and/or qualified to receive a work item and further determine which of the plurality of processing resources 112 is best suited to handle the processing needs of the work item. In situations of work item surplus, the work assignment engine 120 can also make the opposite determination (i.e., determine optimal assignment of a work item to a resource).

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

The contact center can share a common data structure that describes state and extends easily to new and different concepts like goal management, process control, analysis, and context-rich work assignment using a graph database 124. The work assignment mechanism 116 may communicate with the graph database 124 for scalable, durable, and cost-effective modeling of the entire contact center. The model describes all elements and categories of the contact center using nodes and relationships. The nodes can be anything of interest, including but not limited to an attribute (characteristic or feature), a resource, a work-item, a result, a measure, etc. This provides a specific set of information to effectively deliver telephony, data, and services from the contact center to the customer.

In accordance with at least some embodiments of the present disclosure, an analytics module 132 comprises algorithms that may execute a periodic analysis for adaptive modification to determine if a threshold set by an administrator is being exceeded or if a category is being underutilized. More specifically, the analytics module 132 can review attribute tree categories to determine efficiency of the graph database 124 nodes and relationships, based on information and parameters provided by the administrator. Additions, merges, and removal recommendations and alerts provided by the analytics module 132 can be used by the work assignment mechanism 116, the work assignment engine 220, and the routing engine 128 to manage resources based on usage within the contact center and can be adjusted over time.

Figure 2:
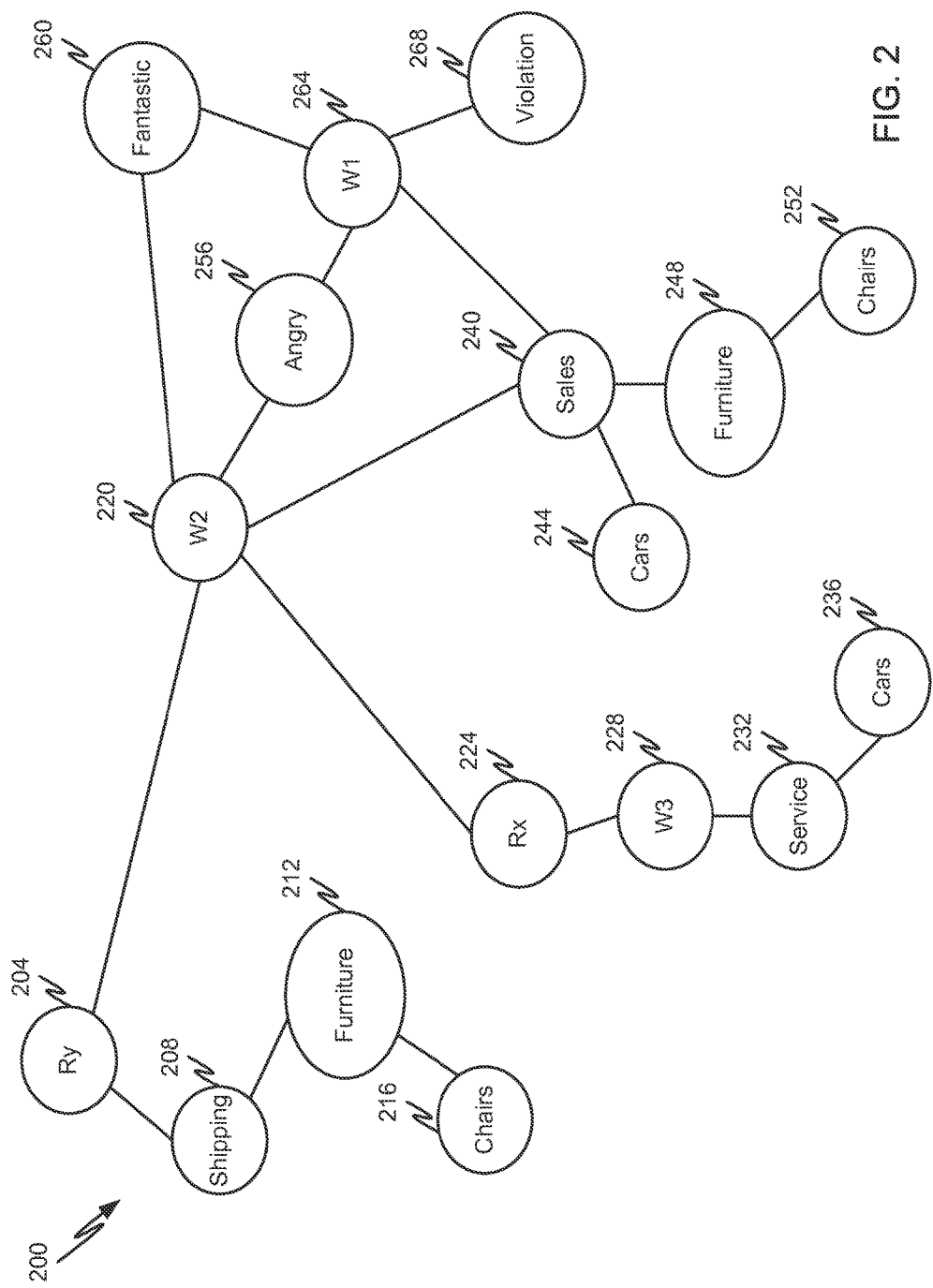
FIG. 2 is a block diagram of a contact center graph database in accordance with embodiments of the present disclosure.

FIG. 2 depicts illustrative data structures 200 which may be incorporated in and used by a graph database 124 in accordance with embodiments of the present disclosure. The graph database 124 allows a contact center to utilize a common data structure that describes state information and extends easily to old and new concepts like attributes, goal management, process control, analysis, metrics, and context-rich work assignment.

The graph database 124 can describe everything within the contact center using nodes and relationships, and may describe the nodes/relationships in a contact center as attributes, work, outcomes, resources 112, etc. In most contact centers, work comes in and may be assessed by a work assignment mechanism 116. Work is typically then assigned by a routing engine 128 to a resource 112 in accordance with a work assignment decision made by the work assignment mechanism 116. In a non-limiting example, a resource x (Rx 224) can be described as capable of handling certain types of work (W3 228) like taking Service 232 calls for Cars 236.

In some embodiments, the graph database 124 categories can include attributes, which may represent a quality or feature of an element. Attributes are commonly considered for matching and routing decisions by a work assignment mechanism 116 to best meet goals and/or desired metrics for a contact center. The graph database 124 can use categories in an attribute tree directly for matching, allowing a naturally defined relationship to provide simple proximity determination.

The data structures 200 in the graph database 124 can grow manually and/or automatically, depending on the interaction with the communication system 100. For example, a resource (Ry 204) may be created by an administrator and be eligible to take work relating to a Shipping 208 category, a Furniture 212 sub-category, and a lower sub-category, Chairs 216. Ry 204 may receive a work item (W1 264) and bring the work item to resolution. The administrator may have created sub-categories Fantastic 260, Angry 256, and Violation 268 to describe the interaction between Ry 204 and W1 264. Details of the interaction may be preserved in an appropriate sub-category within the attribute tree. Ry 204 may receive an additional work item (W2 220), which now has relationship links with existing nodes and relationships may be created, like a connection to Fantastic 260. The graph database 124 may create a relationship between W2 220 and Rx 224 when another work item W3 228 is received and assigned if the Service 232 call for Cars 236 is from the same customer. Ry 204 may receive some additional training, allowing Ry 204 to take calls for a category of Sales 240 that may include the sub-categories of Cars 244 and Furniture 248, with an additional sub-category of Chairs 252. Additional nodes and relationships may be created as more work items come into the contact center and more categories are added.

Figure 3:
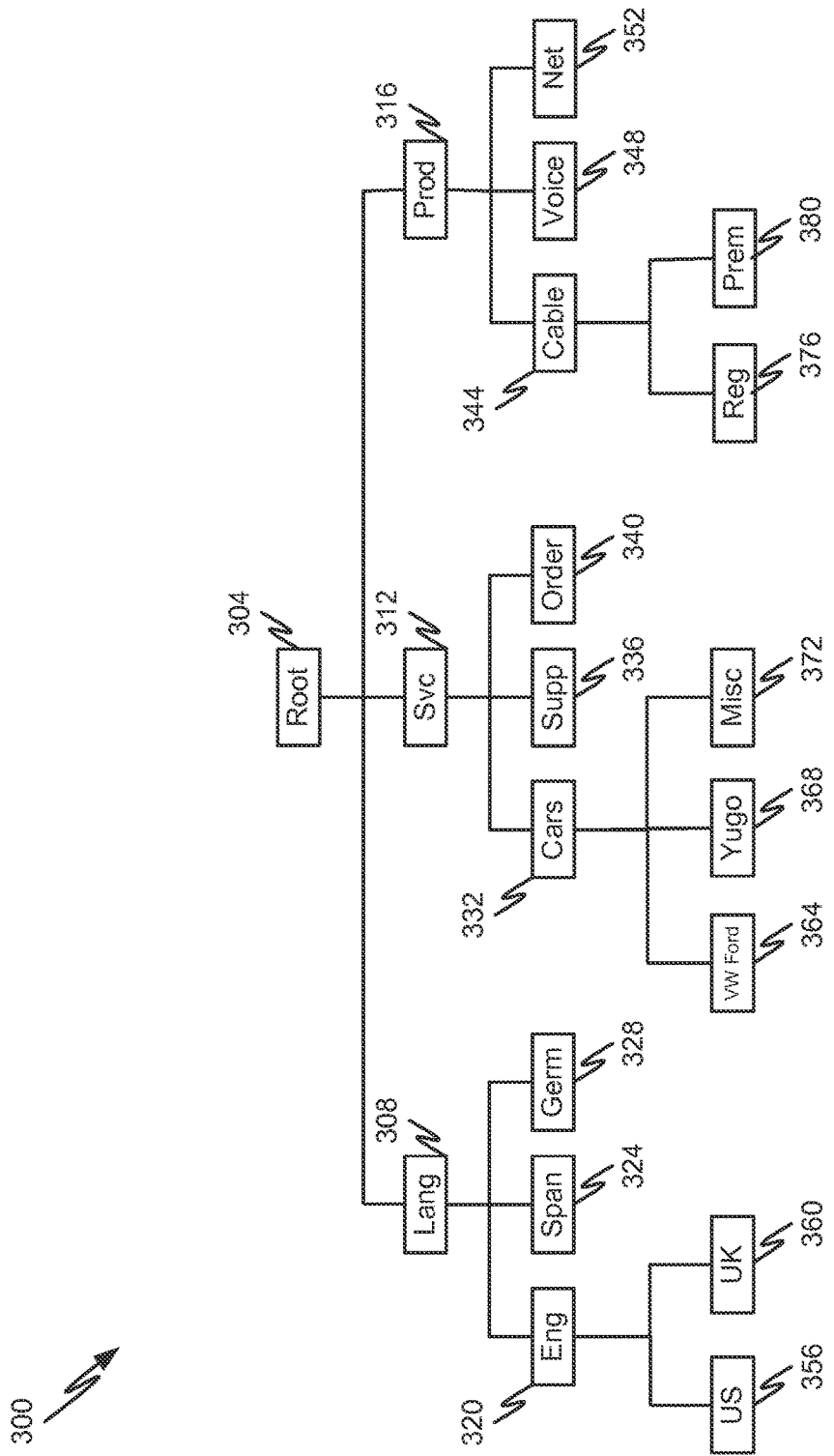
FIG. 3 is a block diagram of an attribute tree in a graph database in accordance with embodiments of the present disclosure.

FIG. 3 is a diagram depicting an attribute tree 300 of a graph database 124 in accordance with embodiments of the present disclosure. The attribute tree 300 may include categories and sub-categories, and in some embodiments, may comprise contact center-specific data elements. The graph database 124 may function as a weighted graph where nodes and relationships within the attribute tree 300 are weighted to assist in matching work items to appropriate resources 112.

In the attribute tree 300, a Root category 304 may be the category into which all categories and sub-categories converge. Lower level categories might include examples like, but not limited to, Language 308, Service 312, and Product 316. Beneath each of the lower level categories may be additional sub-categories. In a non-limiting example, under Language 308, the sub-categories might include English 320, Spanish 324, and German 328 with additional sub-categories of US 356 and UK 360 under the sub-category of English 320. Under Service 312, sub-categories might include Cars 332, Suppliers 336, and Order information 340. Under Cars 332, sub-categories might include Volkswagen (VW) Ford 364, Yugo 368, and Miscellaneous 372. Under Product 316, sub-categories might include Cable 344, Voice 348, and Net 352, with Regular 376 and Premium 380 under the sub-category of Cable 344.

In some embodiments of the graph database 124, adaptive modification may be used to add or remove categories and sub-categories which will be described in more detail in the description presented below.

Figure 4:
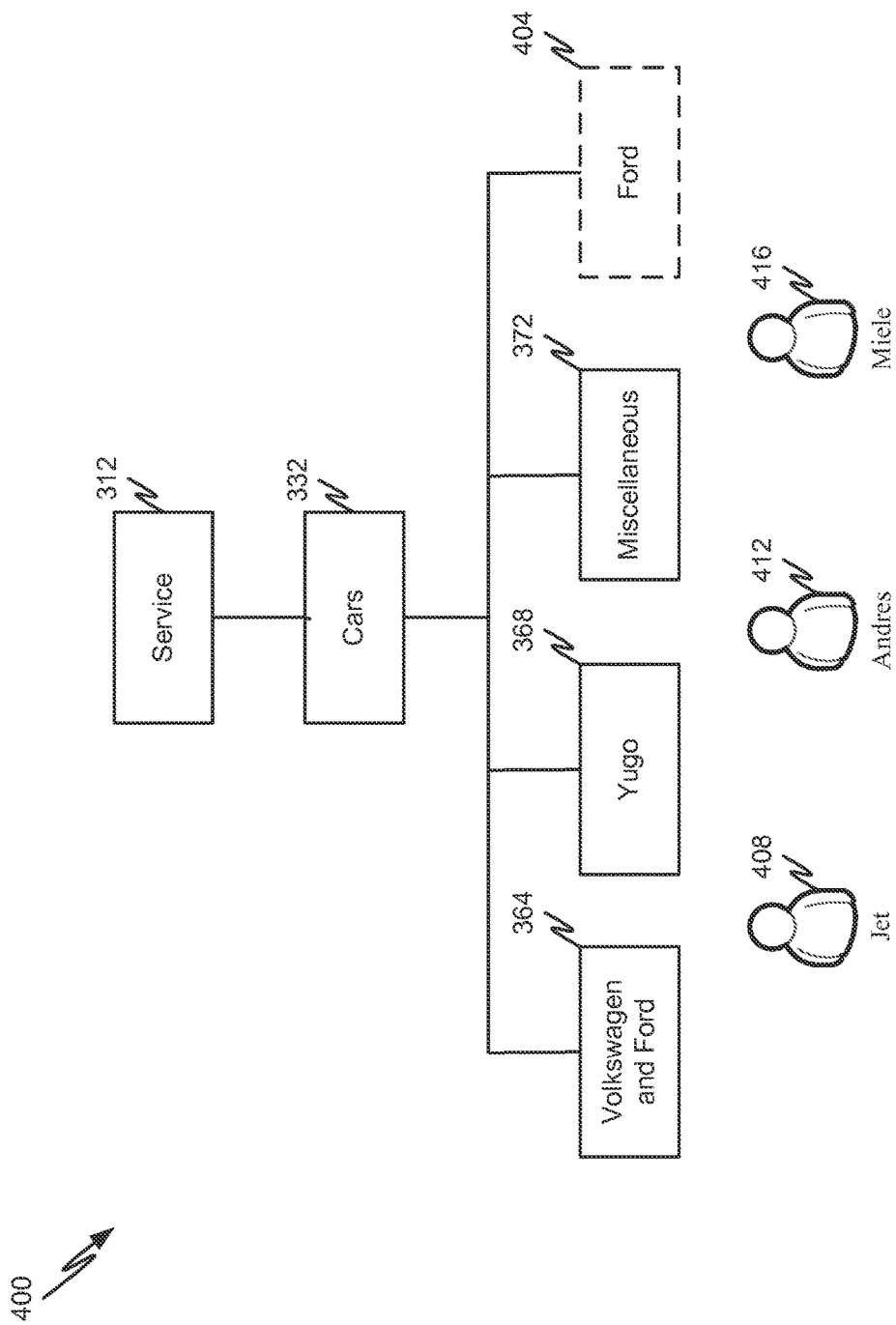
FIG. 4 is a block diagram of a portion of an attribute tree in a graph database in accordance with embodiments of the present disclosure.

FIG. 4 is a block diagram of a portion of an attribute tree 400 of a graph database 124 for a Service 312 category in accordance with embodiments of the present disclosure. Within the graph database 124, high level categories like Service 312 may be defined by an administrator. Service 312 as used herein may be a category within a contact center where questions are answered and routine maintenance, parts information, and repair work are provided. A sub-category of Service 312 might be Cars 332 where resources 112 that are provided by the contact center have some knowledge and/or expertise in the area of car service, information, and parts. Further sub-categories might include types of Cars 332, such as Volkswagen (VW) and Ford 364, Yugo 368, and Miscellaneous 372. Each resource 112 assigned to VW and Ford 364, Yugo 368, and Miscellaneous 372 (e.g., Toyota, Kia, Hyundai, Mercedes, other) may have specialized training for the brand or brands of car for which a customer might request Service 312.

Through periodic analysis for adaptive modification of a graph database 124, an analytics module 132 can determine if a threshold set by an administrator is being exceeded or if a category is underutilized. In a non-limiting example, an agent Jet 408 is assigned to a Service 312 category. Jet 408 may be qualified to take service calls for Cars 332, in particular work items for VW and Ford 364. The graph database sets appropriate weights so that service calls for VW and Ford 364 may be routed to Jet 408.

Data that is collected during a periodic analysis alerts the administrator that the amount of calls coming in for VW and Ford 364 has exceeded a set value. Evidently, there are more calls coming in than the resources 112 can handle based on predetermined thresholds. During the analysis, the graph database 124 sends data to the administrator showing that more calls are coming in for Volkswagen cars than for Ford cars. Based on agent ratings (e.g., Jet 408 has entered that he is more proficient on VW than Ford), the graph database 124 can dynamically split VW and Ford 364 into two sub-categories. Sub-category 1 becomes VW 364 and subcategory 2 becomes Ford 404. Staffing adjustments are made automatically and notification of the sub-category creation completion is sent to the administrator. Based on the staffing adjustments made by adaptive modification, Jet 408, Andres 412, and Miele 416 may be assigned to VW 364, and other resources 112 may be assigned to a newly created sub-category of Ford 404. The routing engine 128 may then appropriately route Service 312 work for Cars 332 for VW 364 and Ford 404 to the newly divided sub-categories as appropriate, thereby correcting the issue of calls going beyond the threshold. The adaptive modification can also provide opportunities for the administrator to provide skill training and cross training for Jet 408, Andres 412, Miele 416 and other resources 112.

In an inverse non-limiting example, an agent Jet 408 is assigned to a Service 312 category. Jet 408 is qualified to take service calls for Cars 332, in particular work items for VW and Ford 364 and Yugo 368. During a periodic analysis for adaptive modification, a graph database 124 sends data to the administrator alerting that no calls are coming in for the category of Yugo 368. The attribute of Yugo 368 may have atrophied as the car is no longer sold and fewer and fewer are on the road over time. While there may be no calls coming in for Yugo 368, resources 416 are still trained on the category of Yugo 368 and a small number of resources 112 are held in reserve. These are wasted resources 112, and the category of Yugo 368 can be removed, via automatic trimming or merging or manually removed by the administrator. During the analysis, the graph database 124 determines that no calls have come in for Yugo 368 in six weeks, a predetermined threshold set by the administrator. The graph database 124 may dynamically remove the category of Yugo 368 and may have the routing engine 128 route any Yugo calls to a group of resources 112 that are qualified on all car types in Miscellaneous 372. Jet's 408 time and energy can be dedicated for VW and Ford 364, and no new employees will be trained or held in reserve to provide Yugo service.

In additional embodiments, categories and subcategories can be automatically or manually separated or combined at any attribute tree level within the graph database 124 before, during, and after periodic analysis. Any instance of separation or combination may be done automatically or manually, triggered by a combination of research, contact center focus and business needs, thresholds, and alerting/alarming.

Figure 5:
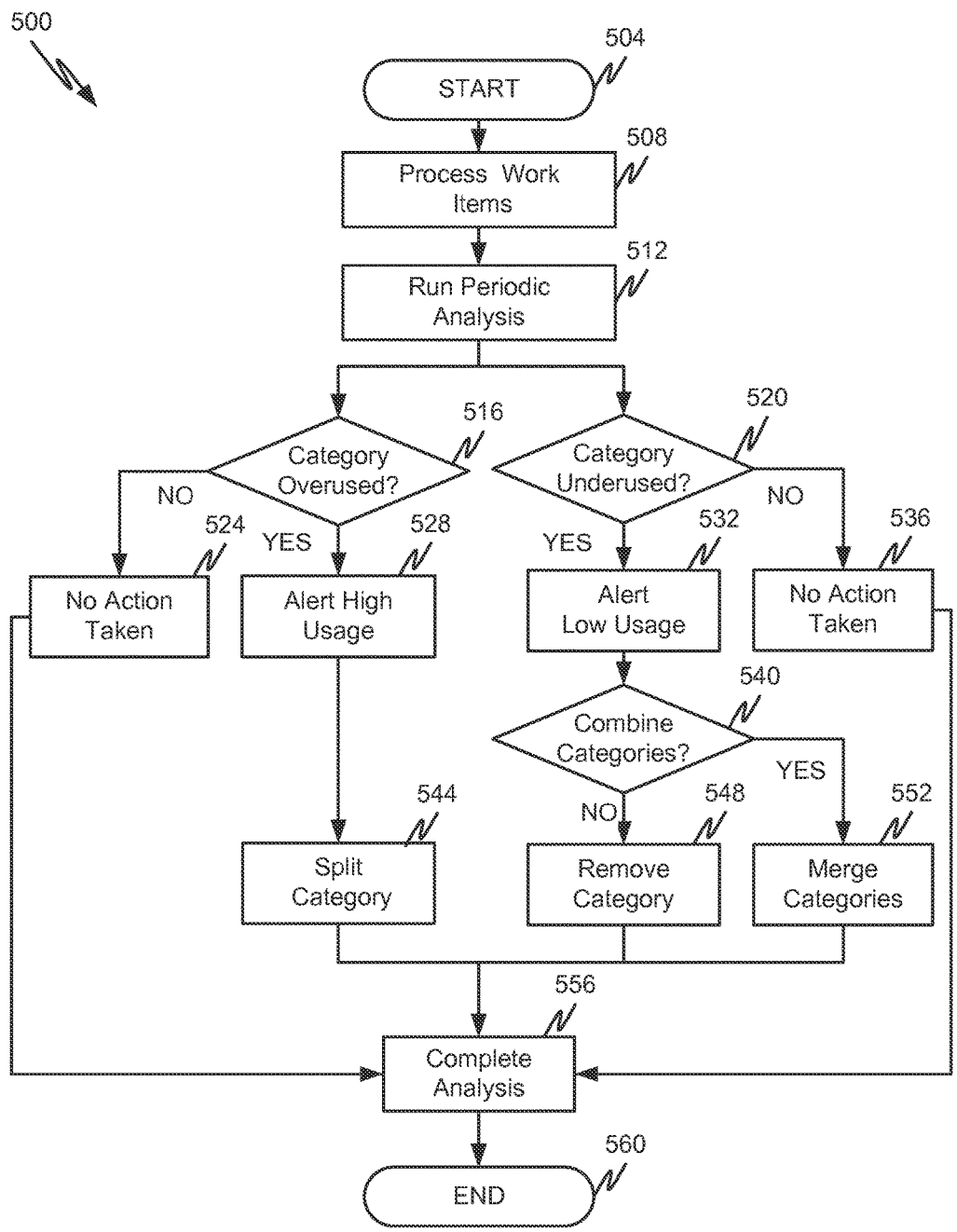
FIG. 5 is a first flow diagram depicting a method for adaptive modification category analysis in accordance with embodiments of the present disclosure.

With reference now to FIG. 5, aspects of a method 500 for adaptive modification category analysis in accordance with embodiments of the present disclosure are depicted. Generally, the method 500 begins with a start operation 504 and terminates with an end operation 560. While a general order for the steps of the method 500 are shown in FIG. 5, the method 500 can include more or fewer steps or the order of the steps can be arranged differently than those shown in FIG. 5. The method 500 can be executed as a set of computer-executable instructions executed by a computer system and encoded or stored on a non-transitory computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 500 shall be explained with reference to the systems, components, modules, software, structures, etc. described in conjunction with FIGS. 1-4.

Generally, the method begins at step 504 and continues when work items come into the work assignment engine 120 within the work assignment mechanism 116. The work item processing begins, in step 508. The work assignment engine 120 may determine when the work item should be processed and by whom. Based on the information delivered with the work item and information in the system (if the customer is known), the work assignment engine 120 can run matching algorithms to determine the best resource to handle the work item. When a contact center is set up, an administrator can set thresholds for graph database 124 categories to determine normal usage.

After a predetermined period of processing work items, the contact center is operable to automatically initiate a periodic analysis, performed by an analytics module 132 in step 512. The periodic analysis can be designed to determine how categories and sub-categories in the graph database 124 are being exercised/utilized and reported to an administrator. In step 516, a question is asked as to whether or not a category is overused, meaning it has exceeded the graph database's 124 threshold for normal usage. If the category is not being overused, meaning that it is below the threshold, no action is taken (step 524). If no action is taken after an administered period of time, the analysis for the category may terminate (step 556). However, if the category is being overused, an alert to the administrator may be sent (step 528). If a high usage threshold has been exceeded, the category may be split into two sub-categories, in step 544. Once the category has been split, the process of analysis may be completed, in step 556. With step 560, the method ends.

In step 520, a question is asked of the analytics module 132 as to whether or not a category is underused, meaning it has fallen below the graph database's 124 threshold for normal usage. If the category is not being underused, meaning that it is above the minimum threshold, no action is taken (step 536). If no action is taken after an administered period of time, the analysis for the category may terminate (step 556). If the category is being underused, an alert to the administrator may be sent (step 532). If usage falling below a minimum threshold has been detected, another question is asked of the analytics module 132 as to whether or not there are two categories that are underused and if the two categories are related and can be combined into one category (step 540). If two low usage categories can be combined based on relationship, the two categories may be merged into one category (step 552). Once the categories have been merged, the process of analysis may be completed, in step 556. With step 560, the method ends. If the low usage categories cannot be combined based on lack of relationship, the underused category may be removed (step 548), either through an automatic process or manually removed by the administrator. Once the category has been removed, the process of analysis may be completed, in step 556. With step 560, the method ends.

Figure 6:
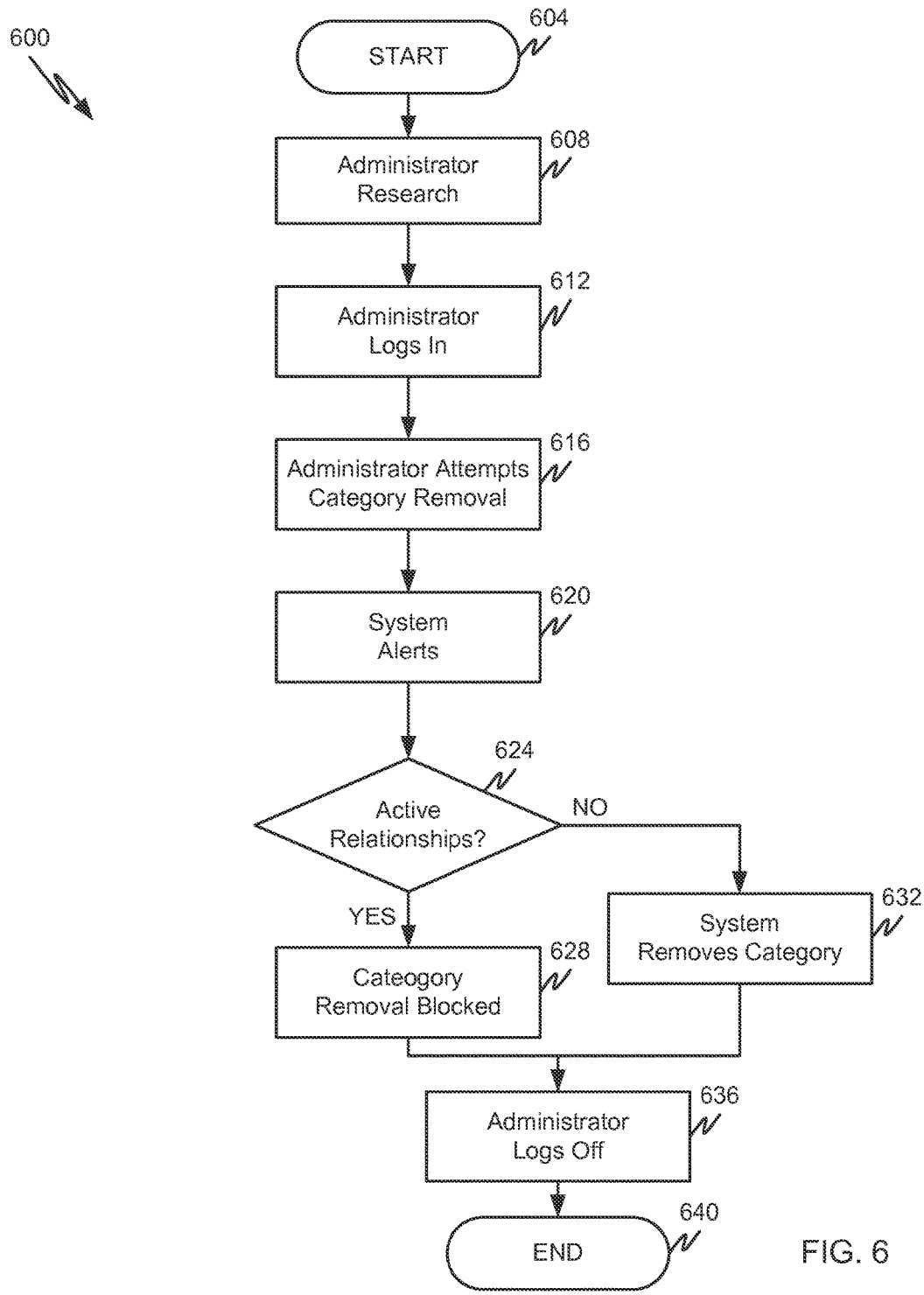
FIG. 6 is a second flow diagram depicting a method for adaptive modification category removal in accordance with embodiments of the present disclosure.

With reference now to FIG. 6, aspects of a method 600 for adaptive modification category removal in accordance with embodiments of the present disclosure are depicted. Generally, the method 600 begins with a start operation 604 and terminates with an end operation 640. While a general order for the steps of the method 600 are shown in FIG. 6, the method 600 can include more or fewer steps or the order of the steps can be arranged differently than those shown in FIG. 6. The method 600 can be executed as a set of computer-executable instructions executed by a computer system and encoded or stored on a non-transitory computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 600 shall be explained with reference to the systems, components, modules, software, structures, etc. described in conjunction with FIGS. 1-5.

Generally, the method begins at step 604 and continues when an administrator decides to look at a periodic analysis provided by a graph database 124 and/or to do research on how a category and/or sub-category is performing. Based on an alert provided by the graph database 124 and/or other metrics from a contact center communication system 100, in step 608, the administrator may do research. The administrator may log in (step 612) if the administrator determines that action should be taken. Once the administrator has determined that an underused category should be removed, the administrator may send a request to the graph database 124 to remove the category, in step 616. The graph database 124 may send an alert (step 620), letting the administrator know that the graph database 124 can run a check for active relationships. In step 624, the graph database 124 with assent from the administrator can run a check to see if the category targeted for removal has active relationships. If the answer to the query is that there are no active relationships with the underused category, the graph database 124 may remove the category, in step 632. Once the category is removed in step 632, the administrator may log off, in step 636. At step 640, the method ends. If the answer to the query is that there are active relationships with the underused category detected, the graph database 124 can block the removal of the underused category, in step 628. The graph database 124 may optionally give the administrator the ability to ask for an analysis of active relationships and/or the ability to override the block. Once the category is blocked in step 628, the administrator may log off (step 636). The method ends at step 640.

It should be appreciated that while embodiments of the present disclosure have been described in connection with a graph based contact center architecture, embodiments of the present disclosure are not so limited. In particular, those skilled in the contact center arts will appreciate that some or all of the concepts described herein may be adapted for use in a queue-based contact center, a queueless contact center, or other traditional contact center architecture.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    defining a model of a contact center, the model of the contact center comprising a plurality of data elements of a graph database, the graph database storing the plurality of data elements without a fixed schema, the plurality of data elements including a plurality of nodes and at least one edge object between a first node and a second node of the plurality of nodes, the at least one edge object having one or more properties defining at least one relationship between the first node and the second node, wherein the plurality of nodes represent work items of the contact center and resources of the contact center, each work item comprising one or more messages requesting a resource of the contact center;
    initiating an analysis routine and, in response thereto, analyzing usage statistics of the plurality of nodes of the graph database, wherein analyzing the nodes comprises analyzing an attribute assigned to the work item or the resource in the contact center represented by each node;
    based on the analysis of the usage statistics, determining whether each node is overused or underused by a work assignment engine of the contact center;
    based on the determination of whether the node is overused or underused by the work assignment engine, deciding to modify the graph database-to increase efficiency of the work assignment engine;
    implementing actions consistent with the decision to modify the graph database, wherein the actions comprise creating and adding at least one new node to the graph database based on determining that at least one node is overused and merging at least one node with another node of the graph database or removing the at least one node from the graph database based on determining that the at least one node of the graph database is underused; and
    in the work assignment engine, routing work items based on the graph database.

2. The method of claim 1, wherein the at least one action comprises providing an automatically-generated message to a contact center administrator that suggests one or more actions.

3. The method of claim 2, wherein the message also comprises a prompt for the contact center administrator that, if selected by the contact center administrator, causes an automatic implementation of the suggested action.

4. The method of claim 1, wherein the graph database comprises at least one relationship that links a first node to a second node in the graph database.

5. The method of claim 4, wherein the analysis routine automatically analyzes usage statistics of every node in the graph database.

6. The method of claim 1, wherein the attribute describes at least one skill of a resource in the contact center.

7. The method of claim 1, wherein the attribute describes at least one processing requirement for a work item in the contact center.

8. The method of claim 1, wherein a node is determined to be an underused node in response to comparing a number of times the attribute represented by the node has been considered by the work assignment engine over a predetermined amount of time with a minimum threshold value and determining, based on the comparison, that the number of times the attribute represented by the node has been considered by the work assignment engine over the predetermined amount of time is less than the minimum threshold value.

9. The method of claim 1, wherein the attribute represented by a node is determined to be an overused attribute in response to comparing a number of times the attribute represented by the node has been considered by the work assignment engine over a predetermined amount of time with a maximum threshold value and determining, based on the comparison, that the number of times the attribute represented by the node has been considered by the work assignment engine over the predetermined amount of time is greater than the maximum threshold value.

10. A non-transitory computer-readable medium comprising processor-executable instructions, which, when executed by a processor, cause the processor to:
define a model of a contact center, the model of the contact center comprising a plurality of data elements of a graph database, the graph database storing the plurality of data elements without a fixed schema, the plurality of data elements including a plurality of nodes and at least one edge object between a first node and a second node of the plurality of nodes, the at least one edge object having one or more properties defining at least one relationship between the first node and the second node, wherein the plurality of nodes represent work items of the contact center and resources of the contact center, each work item comprising one or more messages requesting a resource of the contact center;
initiate an analysis routine and, in response thereto, analyze usage statistics of the plurality of nodes of the graph database, wherein analyzing the nodes comprises analyzing an attribute assigned to the work item or the resource in the contact center represented by each node;
based on the analysis of the usage statistics, determine whether each node is overused or underused by a work assignment engine of the contact center;
based on the determination of whether the node is overused or underused by the work assignment engine, decide to modify the graph database to increase efficiency of the work assignment engine;
implement actions consistent with the decision to modify the graph database, wherein the actions comprise creating and adding at least one new node to the graph database based on determining that at least one node is overused and merging at least one node with another node of the graph database or removing the at least one node from the graph database based on determining that the at least one node of the graph database is underused; and
route work items based on the graph database.

11. The computer-readable medium of claim 10, wherein the at least one action comprises providing an automatically-generated message to a contact center administrator that suggests one or more actions.

12. The computer-readable medium of claim 11, wherein the message also comprises a prompt for the contact center administrator that, if selected by the contact center administrator, causes an automatic implementation of the suggested action.

13. The computer-readable medium of claim 10, wherein the graph database comprises at least one relationship that links a first node to a second node in the graph database.

14. The computer-readable medium of claim 13, wherein the analysis routine automatically analyzes usage statistics of every node in the graph database.

15. The computer-readable medium of claim 10, wherein the attribute describes at least one skill of a resource in the contact center, and wherein the attribute describes at least one processing requirement for a work item in the contact center.

16. The computer-readable medium of claim 10, wherein a node is determined to be an underused node in response to comparing a number of times the attribute represented by the node has been considered by the work assignment engine over a predetermined amount of time with a minimum threshold value and determining, based on the comparison, that the number of times the attribute represented by the node has been considered by the work assignment engine over the predetermined amount of time is less than the minimum threshold value.

17. The computer-readable medium of claim 10, wherein a node is determined to be an overused node in response to comparing a number of times the attribute represented by the node has been considered by the work assignment engine over a predetermined amount of time with a maximum threshold value and determining, based on the comparison, that the number of times the attribute represented by the node has been considered by the work assignment engine over the predetermined amount of time is greater than the maximum threshold value.

18. A communication system, comprising:
a processor; and
a memory coupled with the processor and storing therein a set of instructions which, when executed by the processor, causes the processor to:
define a model of a contact center, the model of the contact center comprising a plurality of data elements of a graph database, the graph database storing the plurality of data elements without a fixed schema, the plurality of data elements including a plurality of nodes and at least one edge object between a first node and a second node of the plurality of nodes, the at least one edge object having one or more properties defining at least one relationship between the first node and the second node, wherein the plurality of nodes represent work items of the contact center and resources of the contact center, each work item comprising one or more messages requesting a resource of the contact center;
initiate an analysis routine and, in response thereto, analyze usage statistics of the plurality of nodes of the graph database, wherein analyzing the nodes comprises analyzing an attribute assigned to the work item or the resource in the contact center represented by each node;

based on the analysis of the usage statistics, determine whether each node is overused or underused by a work assignment engine of the contact center;

based on the determination of whether the node is overused or underused by the work assignment engine, decide to modify the graph database to increase efficiency of the work assignment engine;

implement actions consistent with the decision to modify the graph database, wherein the actions comprise creating and adding at least one new node to the graph database based on determining that at least one node is overused and merging at least one node with another node of the graph database or removing the at least one node from the graph database based on determining that the at least one node of the graph database is underused; and route work items based on the graph database.

* * * * *